(12) United States Patent
Holzwarth et al.

(10) Patent No.: US 6,785,303 B1
(45) Date of Patent: Aug. 31, 2004

(54) GENERATION OF STABILIZED, ULTRA-SHORT LIGHT PULSES AND THE USE THEREOF FOR SYNTHESIZING OPTICAL FREQUENCIES

(75) Inventors: Ronald Holzwarth, Backnang (DE); Jörg Reichert, Ludwigshafen (DE); Thomas Udem, München (DE); Theodor W. Hänsch, München (DE)

(73) Assignee: Max-Planck-Gesellschaft zur Forderung der Wissenschaften e. V., Munich (DE)

( * ) Notice: Subject to any disclaimer, the term of this patent is extended or adjusted under 35 U.S.C. 154(b) by 0 days.

(21) Appl. No.: 09/936,388

(22) PCT Filed: Mar. 10, 2000

(86) PCT No.: PCT/EP00/02135
§ 371 (c)(1),
(2), (4) Date: Jul. 29, 2002

(87) PCT Pub. No.: WO00/55948
PCT Pub. Date: Sep. 21, 2000

(30) Foreign Application Priority Data

Mar. 12, 1999 (DE) .......................................... 199 11 103

(51) Int. Cl.⁷ ............................. H01S 3/11; H01S 3/125; H01S 3/098
(52) U.S. Cl. ............................. 372/16; 372/18; 372/19; 372/98; 372/100
(58) Field of Search ............................. 372/16, 18, 19, 372/98, 100, 25

(56) References Cited

U.S. PATENT DOCUMENTS

| | | | |
|---|---|---|---|
| 4,815,085 A | 3/1989 | Javan .......................... 372/32 |
| 5,054,027 A * | 10/1991 | Goodberlet et al. .......... 372/25 |
| 5,212,698 A * | 5/1993 | Kafka et al. .................. 372/18 |
| 5,235,605 A | 8/1993 | Rines et al. .................. 372/20 |
| 6,038,055 A * | 3/2000 | Hansch et al. ............... 359/279 |
| 6,363,090 B1 * | 3/2002 | Wintner et al. ............... 372/21 |
| 2001/0038652 A1 * | 11/2001 | Geng et al. ................... 372/25 |

FOREIGN PATENT DOCUMENTS

DE 218499 B1 8/1991 ................. 251/823

OTHER PUBLICATIONS

C. Rulliere, ed., Springer Publications. Femtosecond Laser pulses. Berlin 1998.
J.N. Eckstein et al. Physical Review Letters, vol. 40, 1978, p. 847 et seq.
L. Zu et al. Optics Letters, vol. 21, 1996, p. 2008 et seq.
M. Roberts et al. Physical Review Letters, vol. 78, 1997, pp. 1876 et seq.
T. Udem et al. Physical Review Letters, vol. 79, 1997, pp. 2646 et seq.

(List continued on next page.)

*Primary Examiner*—Paul Ip
*Assistant Examiner*—Leith A Al-Nazer
(74) *Attorney, Agent, or Firm*—Duane Morris LLP

(57) ABSTRACT

A process for operation of a laser device (1) is described, whereby circulating light pulses each comprising spectral components according to a plurality of longitudinal modes of a resonator configuration (3) are generated in the resonator configuration (3) and subjected to a compensation of group velocity dispersion, and a predetermined linear dispersion is introduced into the light path of the resonator configuration (3), so that at least one mode has a predetermined frequency and/or the mode distance between the modes has a predetermined value. Furthermore, regulations for stabilizing the laser device on the basis of this process and applications of the regulations for the generation for stabilized, ultra-short light pulses, generation of optical frequencies and in the frequency and/or time measuring technique as well as in the spectroscopy are described.

28 Claims, 10 Drawing Sheets

OTHER PUBLICATIONS

H. Schnatz et al. In Physical Review Letters, vol. 76, 1996, p. 18 et seq.
T.W. Hänsch, G.F. Bassani et al. In Springer Publishing, Berlin 1989, p. 93 et seq.
H.R. Telle et al. In Optics Letter, vol. 15, 1990, p. 532 et seq.
T.W. Hänsch. In Physikalische Blätter, vol. 54, 1998. P. 1007 et seq.
K. Imai et al. In IEEE Journal of Quantum Electronics, vol. 34, 1998, p. 54 et seq.
K.H. Weber et al. In Physical Review A, vol. 35, 1987, p. 4650.
D. Mogilevtsev et al. In Optics Letters, vol. 23, 1998, pp. 1662 et seq.
T.A. Birks. In Optics Letters, vol. 22, 1997, pp. 961 et seq.
T.A. Birks. In IEEE Photonics Letters, vol. 11, 1999, pp. 674 et seq.
Applied Optics, vol. 36, No. 30, 1997, pp. 7752–7755.
Optics Letters, vol. 21, No. 24, 1996, pp. 2008–2010.
Optics Communications, vol. 133, 1997. 201–204.
Laser und Optoelektronik, vol. 24, No. 5, 1992, pp. 56–61.
J. Opt. Technol., vol. 64, No. 1, 1997, pp. 3–14.
Review of Scientific Instrum., vol. 69, No. 3, 1998, pp. 1207–1223.
T. Udem et al. In Optics Letters, vol. 23, No. 17, 1998, pp. 1387–1389.

* cited by examiner

GENERATION OF STABILIZED, ULTRA-SHORT LIGHT PULSES AND THE USE THEREOF FOR SYNTHESIZING OPTICAL FREQUENCIES

BACKGROUND OF THE INVENTION.

The invention concerns a process for the generation of ultra-short laser light pulses, in particular a process for stabilizing of the operation of a pulse laser, and a process for the production of highly accurate optical frequencies, and a laser device for the generation of ultra-short light pulses, in particular a frequency stabilized pulse laser, and applications of such a laser device in spectroscopy, time or frequency measurement technology and communications technology.

The production of ultra-short laser light pulses (light pulses with a typical pulse duration in ns- to fs- range) known since the 1970s is based on so-called mode synchronization. In a laser medium many fundamental oscillations with different frequencies may be generated, given sufficient bandwidth of the laser transition in the resonator. If a suitable mechanism is provided to produce a stable phase relationship between the fundamental oscillations (mode synchronization), short light pulses with a time separation are produced, being equal to the quotient of the doubled resonator length and circulation velocity of the pulses, and corresponding in their spectroscopic composition to the optical frequencies generated in the resonator and contributing to the formation of the pulses.

A so-called frequency comb is obtained from a Fourier transformation of the course of intensity of the laser beam's pulse form, formed through δ-type functions of optical frequencies contributing to each pulse and whose envelope is within the bandwidth of the laser transition in the laser medium. Essentially, the width of the envelope is inversely proportional to the pulse duration. An example for such a frequency comb is shown schematically in FIG. 5. Each contributing frequency to such a frequency comb is designated as mode M. Corresponding to the longitudinal laser modes, the frequency separations of the elements of the frequency comb are even number multiples of the pulse repetition frequency $f_r = \tau^{-1}$ (repetition rate) . The comb structure of fspulses in the frequency space is described, for example, in "Femtosecond Laser Pulses" (C. Rulliere, ed., Springer Publications, Berlin 1998).

Since the pulse repetition frequency $f_r$ depends on the resonator length, deviations of the ideally stable mode intervals occur even in the presence of most insignificant instabilities of the resonator. Techniques for the stabilization of the resonator length are known, which suppress changes in the mode intervals. To this end, a movable resonator end mirror in the direction along the length of the resonator is installed and adjusted in the presence of a mode shift through the use of a control loop. This conventional stabilization method is insufficient for the present-day accuracy requirements in the use of spectroscopy or time measurement technology.

J. N. Eckstein et al. (see "Physical Review Letters", Vol. 40, 1978, p. 847 et seq.) recognized that the row of the modes would be suitable as a scale for frequency calibration At the same time the insufficient stability of the pulse laser and noise-related shifts in mode frequencies were pointed out. It was observed that the shifts continued to occur in spite of the stabilization of the resonator length. According to L. Xu et al. In "Optics Letters", Vol. 21, 1996, p. 2008 et seq., the cause is the group velocity of a pulse, which determines the circulation time in the resonator and therefore the repetition frequency, as a rule does not correspond to the phase velocity of the individual modes. The modes separated by the even number multiples of the repetition frequency cannot be represented in their absolute frequency position through even number multiples (n) of the repetition frequency $f_r$, but rather through the sum $(n \cdot f_r + f_p)$ of n·repetition frequency $f_r$ and a so-called phase slip frequency $f_p$ which has the same value for all modes, corresponding to the quotient of the respective phase differences from pulse to pulse through the circulation time $(2\Pi)\tau$. A determination of these phase differences is until now not available, so that the use of pulse lasers for measuring purposes or as generators of optical frequencies is limited.

In the following, two areas in which there is an interest in highly accurate frequencies will be described. The first application concerns frequency measurement generally, in particular making time or frequency standards available. The second application lies in the area of spectroscopy, in particular the measurement of atomic electronic energy transitions.

A widely used time standard is given through the so-called cesium atom clock with a base frequency of 9.2 GHz. The time measurement is carried out through a direct counting out of the base oscillations, which is presently possible with a degree of accuracy of for example $10^{-4}$. Significantly higher relative accuracy up to the magnitude of $10^{-18}$ are expected from optical frequency standards, for example on the basis of cooled ions in field cages (see, e.g., M. Roberts et al. In "Physical Review Letters", Vol. 78, 1997, pp. 1876 et seq.) or from the extremely narrow atomic resonances such as that of the 1S-2S-transition of hydrogen (see, e.g., T. Udem et al. In "Physical Review Letters," Vol. 79, 1997, pp. 2646 et seq.). These frequency standards possess;, however, optical frequencies above 80 THz, which can no longer be counted out directly electronically. For an optical clock, one needs therefore an apparatus for frequency transformation from the high frequency of the frequency standard to a low frequency that can be evaluated through electronic means. Such an apparatus possesses the function of a "clockwork" for an "optical clock."

Harmonic frequency chains are used for the bridging of the large frequency separation between optical frequencies and. (electronically countable) radio frequencies (see H. Schnatz et al. In "Physical Review Letters", Vol. 76, 1996, P. 18 et seq.). With a harmonic frequency chain, a reference frequency is multiplied with even number factors at a number of multiplication stages, until the desired frequency is attained. This requires, however, a separate transfer oscillator with a phase coupling to the preceding harmonic signal for each multiplication level. The availability of a numerous oscillators at various frequencies makes the setup voluminous, complicated, and expensive.

FIG. 13 illustrates a further principle of a well-known scaling stage for optical frequencies (see T. W. Hänsch in "The Hydrogen Atom", ed. G. F. Bassani et al., Springer Publishing, Berlin 1989, p. 93 et seq.; H. R. Telle et al. In "Optics Letter", Vol. 15, 1990, p. 532 et seq.; and T. W. Hänsch in "Physikalische Blätter," Vol. 54, 1998. P. 1007 et seq.). If one overlaps two laser beams that differ only slightly in frequency onto a photo detector, one observes a modulation of light intensity at the differential frequency (beat signal). This beat signal may be used to adjust the frequency of one partial beam onto the frequency of the other partial beam. According to the scheme of FIG. 13, two laser frequencies $f_1$ and $f_2$ are compared to a third laser frequency $f_3$ near the middle frequency $(f_1+f_2/2)$. The summation frequency $f_1+f_2$ is produced with a nonlinear crystal (+), and the upper harmonic vibration 2 $f_3$ is produced with a further nonlinear crystal (×2). The lower frequency beat signal at the photo detector is used in the digital control loop $\Phi$ to control the frequency and phase of the third laser to oscillate precisely on the middle frequency, i.e. $f_3=(f_1+f_2)/2$. Thus a frequency interval $\Delta f$ is reducible by a factor $\frac{1}{2}^n$ with a chain of n scaling stages according to FIG. 13. If one begins such a chain of scaling stages with a laser frequency f and its second upper harmonic 2f, that is, with $\Delta f=f$, then one obtains a differential frequency of $f/2^n$ after n scaling stages. The problem with the described scaling chains is that at least twelve scaling stages are needed to bridge the frequency gap between optical frequencies ($f_{opt}$>300 THz) and radio frequencies ($f_{radio}$<GHz) This presents an apparatus requirement that is unacceptably high for routine applications.

Using an optical frequency comb generator (OFC) has been suggested to reduce the number of required scaling stages required (see K. Imai et al. in "IEEE Journal of Quantum Electronics," Vol. 34, 1998, p. 54 et seq). In an OFC, side bands on an optical carrier frequency are produced with a resonator adapted for optical and microwave frequencies, which are separated by a distance determined by a given microwave frequency. For the given frequency gap approx. five or six scaling stages are still necessary even with the use of an OFC. Details of an OFC are also explained in the named publication of T. W. Hänsch in "Physikalische Blätter," 1998.

With a view to the creation of a "clock work" for optical frequency standards, there is an interest in an optical frequency generator in which particularly large frequency differences are bridged with a relative accuracy that is significantly better than $10^{-14}$ and in particular makes a decrease in the number of scaling stages possible.

The second application of optical frequency generators in spectroscopy concerns the highly accurate frequency measurement of the light of a spectroscopy laser. The absolute frequency of, for example, the $D_1$ resonance line of cesium could until now only measured with a relative accuracy of approx. $10^{-7}$ (See K. H. Weber et al. in "Physical Review A", Vol. 35, 1987, p. 4650). There is an interest in the increasing of accuracy of frequency measurement of electronic states.

BRIEF SUMMARY OF THE INVENTION

It is the object of the invention to provide a new process for the operation of a pulse laser with defined pulse parameters, in particular with defined mode positions, which makes possible a significant increase in accuracy in the production or measurement of optical frequencies and/or optical differential frequencies. In particular, the possibility of stabilizing the operation of a pulse laser is to be provided with this process, which can be implemented as a simple, reliable, quickly functioning and accurate means of regulation. It is also an object of the invention to provide a method for the generation or measurement of optical frequencies and/or optical differential frequencies. The object of the invention also consists of providing a device for the implementation of the process. Further, new applications of optical frequency generators are to be given with the invention.

These objects are solved with the processes and devices having the characteristics as set forth in the appended claims. Advantages embodiments and applications of the invention are defined in the dependent claims.

In accordance with a first aspect of the invention, a method for the operation of a pulse laser is given, in which light pulses circulating in a resonator configuration are produced, whereby a predetermined setting of various phase shifts for various spectral components of the light pulses is provided. Through the introduction of a linear dispersion (first order dispersion), at least one mode obtains a certain frequency and/or the mode distance between the modes is set to a certain value. It can be provided in particular that each mode is subject to a spectrally specific frequency change. The setting of spectrally different effective resonator lengths can follow through various measures for the introduction of a linear dispersion into the resonator. Among these is a geometric, spectrally specific resonator length setting in a resonator part, in which the pulses circulate spatially separated, the introduction of material with a linear dispersion into the resonator configuration and/or measures for setting of the pumping power at the laser medium. The portion of the resonator in which the pulses circulate in a spatially separated manner is arranged on the side of an apparatus for the compensation of the dispersion of group velocity (pulse compressor) which is turned away from the laser medium of the pulse laser. The introduction of a linear dispersion is to be differentiated from the compensation or setting of a group velocity dispersion (second order dispersion), which is necessary for pulse production.

Pursuant to a particular embodiment, the method of the invention is carried out as a control method for the stabilization of the operation of a pulse laser, in which the phase circulation time of the light pulse is varied dependent upon a frequency deviation of at least a first reference mode from a reference frequency. The pulse laser is stabilized with a mode control loop in relation to the reference frequency and with a repetition frequency control loop in relation to a frequency normal. The control loops work together for the adjustment of the pulse repetition frequency $f_r$ and the mode positions.

The pulse laser possesses a dispersion setting device for the adjustment of the linear dispersion in the resonator and a resonator length setting device for the adjustment of the resonator length. On the basis of the working together of both control loops described in detail below, it is provided that either the dispersion setting device in the mode control loop and the resonator length setting device in the repetition frequency control loop or, in reverse, the resonator length setting device in the mode control loop and the dispersion setting device in the repetition frequency control loop, be regulated.

According to a further embodiment of the invention, these control loops can work together with a reference laser control loop, with which the reference frequency is stabilized in relation to a second reference mode of the frequency comb.

According to a further embodiment, the inventive method is carried out as a control method for the operation of a reference laser with a stabilized reference frequency. The reference laser is regulated dependent upon a frequency deviation of the reference frequency (or its even number fractionals or multiples) of at least one reference mode of the light pulses circulating in the pulse laser, stabilized in relation to a frequency normal. The entire system with the reference laser makes up an inventive optical frequency synthesizer.

According to a second aspect of the invention, a laser device for the production of short light pulses is given, in which a resonator configuration with an active medium, a number of resonator mirrors and compensatory device for the compensation of the group velocity dispersion of the light pulses is provided, whereby the resonator configuration has at least one adjustable dispersion setting device for the adjustment of the phase circulation time of the light pulses according to the measures described above. The adjustment of the phase circulation time is provided preferably as a control simultaneous to the control of the repetition frequency with use of the mode and repetition frequency control loop.

The dispersion setting device is preferably provided in a branch of the resonator on the side of the compensation apparatus opposite relative to the active medium, for example, in the form of a tilting mechanism at a resonator end mirror. Alternatively, the dispersion setting device can be a transparent plate that can be angled or an insertable pair of prisms or also formed as an apparatus for the variation of the pumping power for the laser medium.

According to a further important aspect of the invention, a broad frequency comb is generated with a stabilized pulse laser device according to the invention, which frequency comb contains the first reference mode in a lower frequency range, whereby the second reference mode in a higher frequency range is used for adjusting the reference frequency of the mode control loop in the frame of a (third) reference laser control loop.

According to a further important aspect of the invention, a laser device is stabilized through the use of a frequency normal, preferably of a radio frequency source, so that the laser device and/or a reference laser coupled to it forms a generator of optical frequencies (optical frequency synthesizer) for precision applications in time or frequency measurement technology.

BRIEF DESCRIPTION OF THE DRAWINGS

Advantages and details of the invention are described as follows with relation to the accompanying figures. They show as follows.

DETAILED DESCRIPTION OF THE INVENTION

Although the operation of a stabilized pulse laser using various stabilizing control mechanisms represents a preferred embodiment of the invention, the object described above is already solved through a laser device with a resonator configuration that has varying, predetermined phase shifts for the various spectral components of the circulating pulses. Such a laser device is explained first with relation to FIG. 1. Following, the introduction of the stabilizing control is illustrated and the applications of the invention are described.

Laser Device with Spectrally Specific Adjustable Phase Shifts

Figure 1:
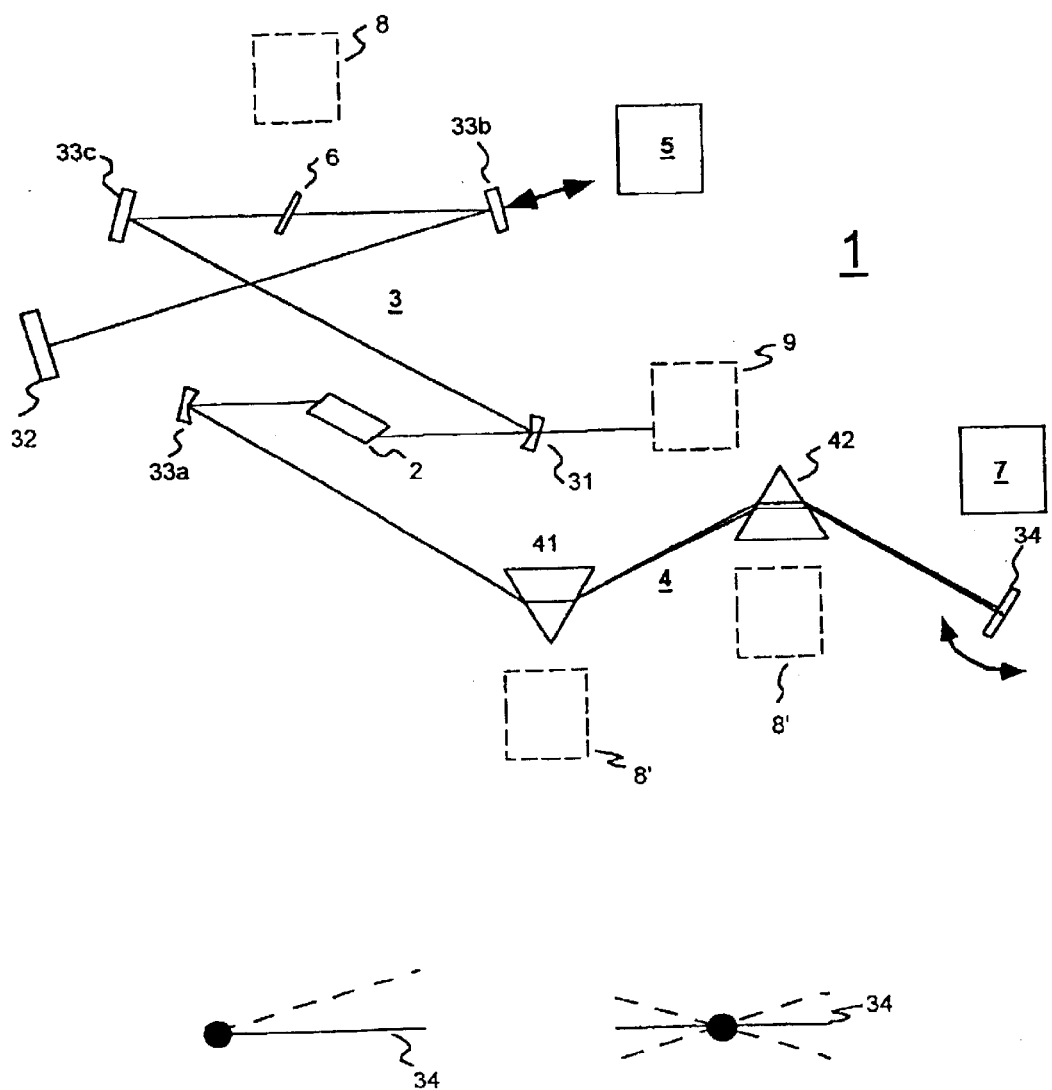
FIG. 1 a schematic overview of a laser device according to the invention.

FIG. 1 shows schematically an embodiment of the laser device 1 according to the invention having an active laser medium 2 in a resonator configuration 3, encompassing an input mirror 31 (incoupling mirror), an output mirror 32 (outcoupling mirror), several tilted mirrors 33a, 33b, 33c, and a plane end mirror 34. The active laser medium 2 is a Ti:Al$_2$O$_3$ crystal (mode coupled with a Kerr lens, for example the commercially available "Coherent Mira 900", pulse length 73 fs, repetition frequency f$_r$=75 MHz), pumped through the input mirror 31 with a diode pumped, frequency-doubled single frequency Nd:YVO$_4$ laser (e.g. "Coherent Verdi", after frequency doubling: λ=532 nm, power 5 W). In the resonator 3 is arranged further a compensating device 4 between the tilted mirror 33a and the end mirror 34 for the compensation of the group velocity dispersion of the circulating light pulses (pulse compressor). In the example shown the compensation device 4 comprises two prisms 41, 42, whose position in relation to the beam path in the resonator configuration is adjusted by means known as such. The function of the prisms 41, 42 could also be taken on by other spectrally effective elements such as chirped resonator mirrors (see also "Femto-second Laser Pulses" by C. Rulliere).

Depending on the use, a laser with a higher repetition frequency f$_r$ (for example 1 GHz or more) is implemented. Higher repetition frequencies result in larger mode intervals that are more easily identifiable and more accessible to the beat measurement explained below.

The resonator length may be adjusted through shifting of the tilted mirrors 33b corresponding to their mirror normals (direction of arrow). The tilted mirror 33b is fitted with a sliding mechanism 5 functioning as a resonator length setting device. The sliding mechanism 5 is for example a Piezo mechanism controlled by a well-known method. The reference number 6 denotes a double breaking filter (Lyot-filter).

The resonator configuration 3, insofar as it has been described to this point, is known as such and may be modified according to the usual measures for pulse formation, pulse measurement and the like. The resonator configuration 3 according to the invention differs from conventional resonators, however, through the introduction of a setting device for the adjustment and/or regulation of the linear dispersion in the resonator. This setting device, also called a dispersion setting device in relation to the control loops explained below, may be implemented through various measures, illustrated for example in FIG. 1 by the tiltable or rotatable end mirror 34. The repetition frequency f$_r$ as well as the mode frequencies, through regulation of the group and phase circulation times of the solitonen-like pulses circulating in the resonator, may be fixed by the introduction of the dispersion setting device operating in conjunction with the sliding mechanism 5 for the setting of the tilted mirror 33b.

The pivotable end mirror 34 is to be located in the resonator branch on the side of the compensating apparatus 4 turned away from the active medium. The pivotability means that the end mirror 34 is rotatable around an axis that stands vertically on the reference plane, in which the spectral pulse splitting in the compensating apparatus 4 is carried out. Two enlarged depictions of the rotatable end mirror 34 are shown in the bottom portion of FIG. 1. The end mirror 34 is operated with a rotational apparatus shown schematically, for example through a Piezo mechanism. The setting of the end mirror 34 to a certain position achieves the following effect.

On the side of the compensating apparatus 4 turned away from the active laser medium 2, the pulses are spatially resolved. The modes run next to each other. One mode hits the mirror 34 just at the rotational axis of the pivoting apparatus (or closest to this rotational axis). This mode is not changed (or changed only minimally) through the rotation of the mirror 34. All other modes have a spatial distance to this mode and are pulled apart through the rotation with an increasing rotational angle. The mode distances change and with it also the repetition frequency $f_r$ of the light pulses. A phase shift proportional to the frequency separation of the two modes and corresponding to the change in linear dispersion is introduced geometrically through the rotation of the end mirror. The phase shift provides a time shift of the pulses and changes correspondingly the effective resonator circulation time. Consequently the group circulation time is changed in contrast to the group velocity dispersion (dispersion of the second order) which causes the pulses to spread spectrally. This leads to a setting of the positions of the mode frequencies (or to a fixing following the regulation shown in FIGS. 2–4).

The pivotable end mirror 34 is placed on a ball bearing with the rotational axis either at the edge of the mirror (FIG. 1, bottom left) or in the middle of the mirror (FIG. 1, bottom right). The location in the middle of the mirror is preferred because no change in the average resonator length results from the rotation, and the placement is easier. With a location at the edge of the mirror, a possible adjustment of the resonator length is contemplated. The rotational angle is between 0.005° and 0.05°. This corresponds for example to a rotation of the free mirror edge by about 5 μm if the width of the mirror is about 2 cm. The rotation of the pivoting apparatus 7 takes place on a continuous scale.

According to an alternative embodiment of the first setting device, the end mirror 34 is fixed. A transparent pair of prisms that may be pushed in or a rotatable transparent plate with a sliding or pivoting device 8', 8 (shown in dotted lines) is contemplated for any chosen resonator part for the optical introduction of the linear dispersion. The pair of prisms has an opening angle preferably corresponding to the Brewster angle in the contemplated wavelength range (for example around 69°). The plate has a thickness of 2 mm, for example. The function of the pair of prisms or the plate, which may be of glass, corresponds to the function of the rotatable end mirror 34 described above, whereby an additional adjustment of the resonator length is necessitated due to the additional transparent medium. A longer or shorter light path travels through the glass (e.g. Kron glass SF10, quartz glass) as the pair of prisms (dimension about μm) is slid or the plate is tilted (dimension about μm), so that the linear dispersion changes correspondingly. The plate may be formed through the Lyot filter 6. Correspondingly the pair of prisms may also be formed through the prisms 41, 42 of the compensating apparatus. The plate may be fitted with a wedge in order to avoid interference phenomena.

It must be emphasized that the sliding mechanism 8' should not be mistaken for the well-known sliding track forms of conventional pulse compressors. The sliding apparatus (for example with Piezo mechanism) is for changes in position in the μm range, whereas the sliding tracks are adjustable in the mm range.

A further possibility for the adjustment of the linear dispersion in the resonator is through a predetermined setting of the pumping power for the active laser medium 2. The pump light is modulated outside the resonator (before the incoupling mirror 31) for example with an electro-optical intensity modulator (shown in dotted lines). Consequently the linear dispersion in the active medium 2 is changed in particular. Modulations in the %-range suffice for the variation in the pumping capacity. Further possible linear dispersion changes are set forth below in relation to a ring laser.

The construction of the laser device in FIG. 1 may be modified with respect to the choice of the active laser medium and the laser parameters (in particular pulse duration, power, and spectral composition of the pulses). The laser device 1 may be combined with an optical fiber 201 after the out-coupling mirror 32 (see FIG. 2), whose function is explained below. It is also possible to arrange the sliding mechanism 5 and the pivotional device 7 at the end mirror 34 so that both the spectrally independent setting of the resonator length as well as the influencing of the linear dispersion in the resonator take place at the end mirror.

A ring laser may be operated with the stabilization taught by the invention instead of the construction shown in FIG. 1. A ring laser is generally a laser device with a ring resonator comprising at least three mirrors, between which the laser pulses, possibly with intersecting light beams, circulate. Further, the ring laser contains the laser medium and possibly further optical components. For example, four mirrors are provided as generally shown in the above book by C. Rulliere (P. 60, FIG. 3.5). This construction is expressly included in the present specification.

In a ring laser, the group velocity is compensated not with a pair of prisms but with at least one chirped end mirror. The frequency variations specific to the mode, as taught by the invention, are introduced by one of the following measures. First, a direct intensity modulation can be provided for at the pump laser. The intensity modulation is adjusted depending upon the signals from the control loops described below and is around 5%. Second, a change in the geometrical relationship between the pump beam and the pulse laser medium may be provided. Through a tilting of the pump beam and/or the pulse laser medium relative to each other, a modulation of the effective intensity of the pump beam may in turn be achieved. The tilting is set through regulating mechanisms at the pump laser and/or pulse laser depending on the control loop signals and may be, for example, around 0.05°. Alternatively, a mutual shifting may be provided for. Through a shift of the pump stream in the pulse laser medium (around 50 μm in the titan sapphire laser, for example) the location of the impulse in the pulse laser medium and with it the effective intensity of the pump stream are varied.

The construction of a stabilized ring laser has the advantage of saving much space. The ring laser may be constructed so compactly that the entire configuration fits into an area of 20·30 cm² (or less).

Laser Device with Controlled Stabilization

The laser device illustrated in FIG. 1 is operated according to the invention preferably with implementation of at least three control loops, which are explained below with relation to FIGS. 2–4 and 12. The stabilization of a pulse laser is not limited to the laser device 1 according to FIG. 1, however, it may be implemented correspondingly with other types of lasers for the production of ultra-short light pulses (for example fiber lasers, color center lasers, gas lasers, and due lasers). The combination with a compact femtosecond laser (fiber laser, titan sapphire laser) is preferred for practical applications because of its stability and compactness, however.

Figure 2:
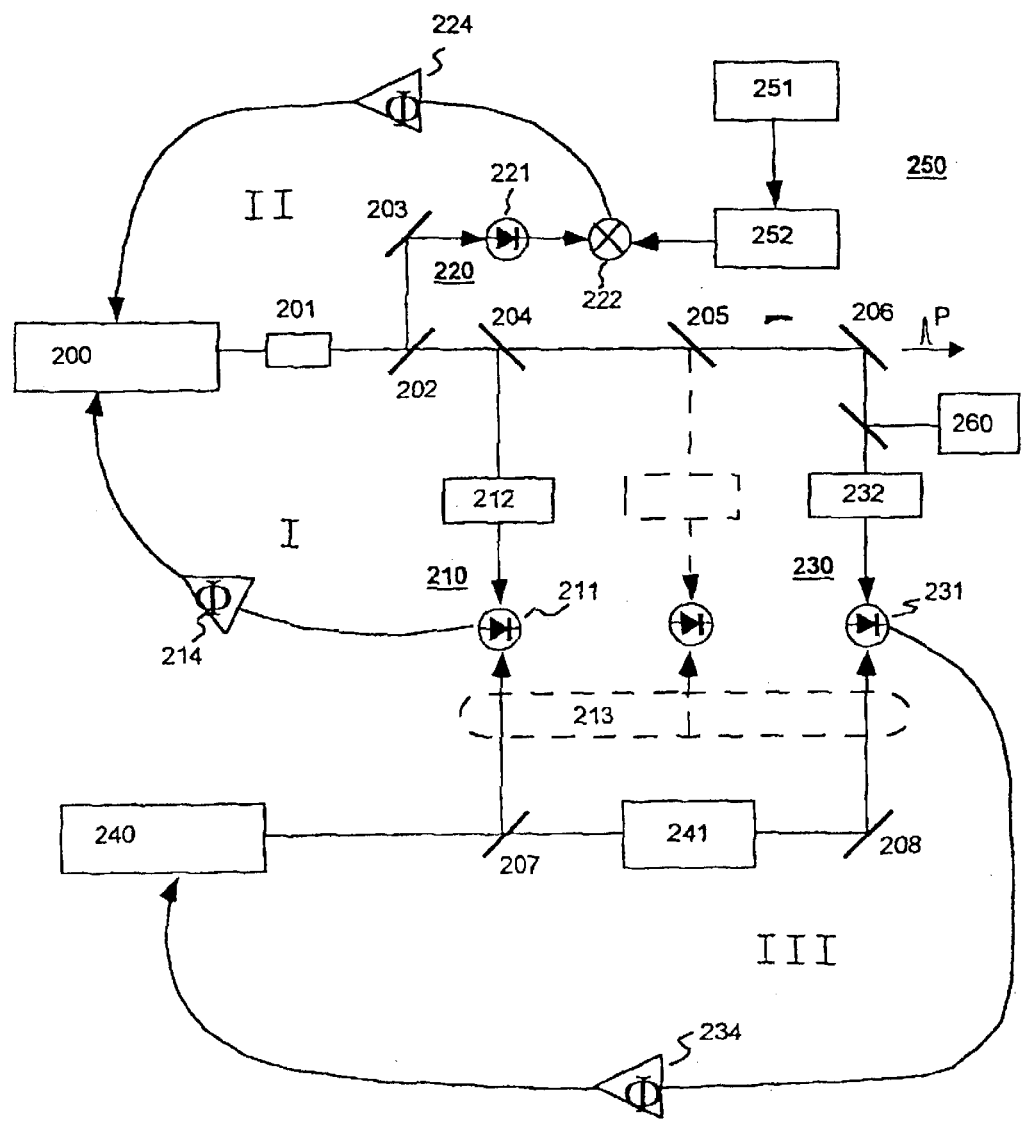
FIGS. 2–4 illustrations of embodiments of a stabilized laser device according to the invention.

FIG. 2 shows schematically the construction of three control loops, namely, the mode control loop I, the repetition frequency control loop II and the reference laser control loop III, in a first embodiment. In a stabilized, regulated laser device preferable all three control loops are implemented. Operation with control loops I and II alone, in particular with the availability of a sufficiently stable reference laser, is also possible, this even with combination of control loops I and II with a single control mechanism.

Figure 3:
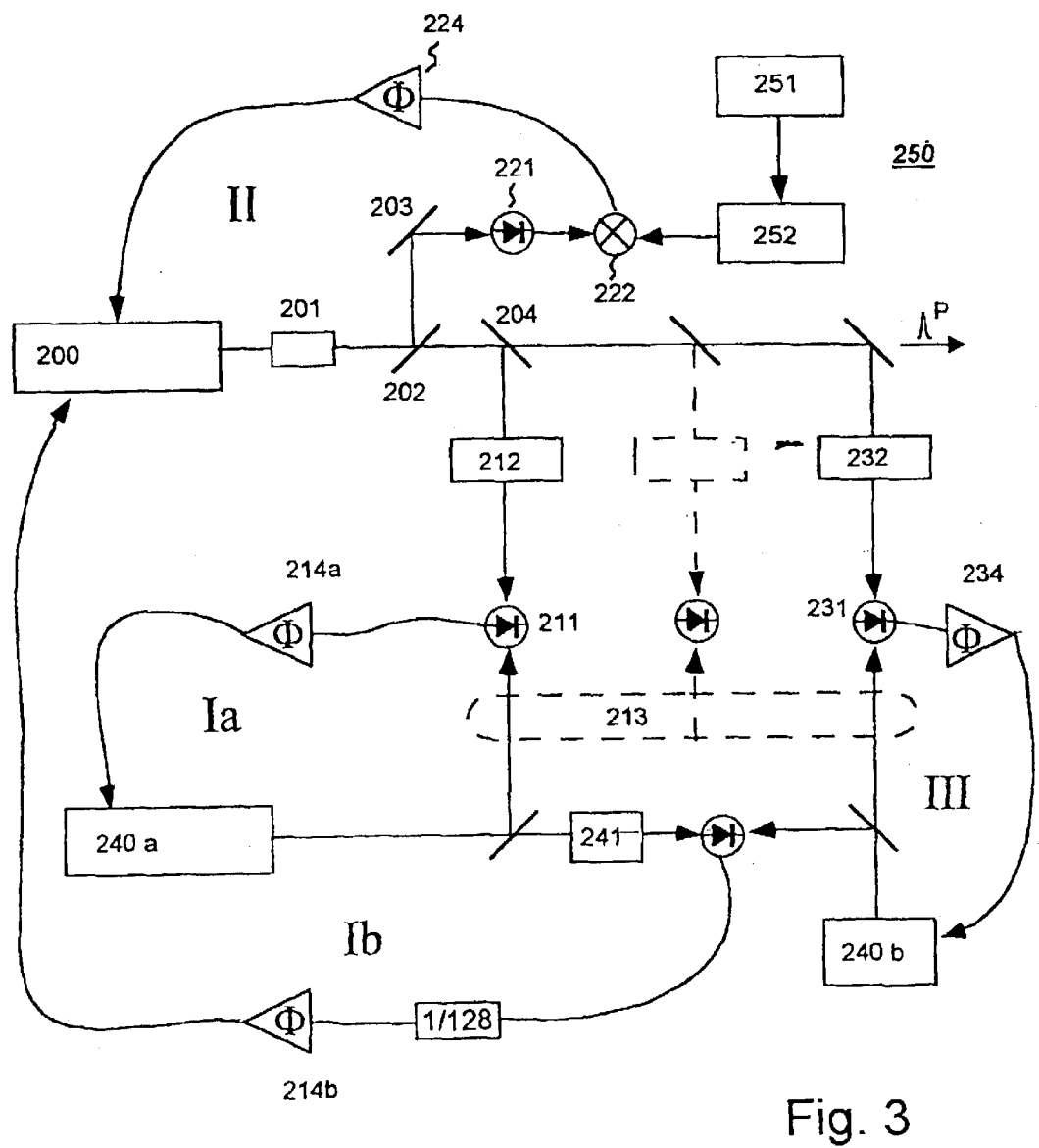
Figure 4:
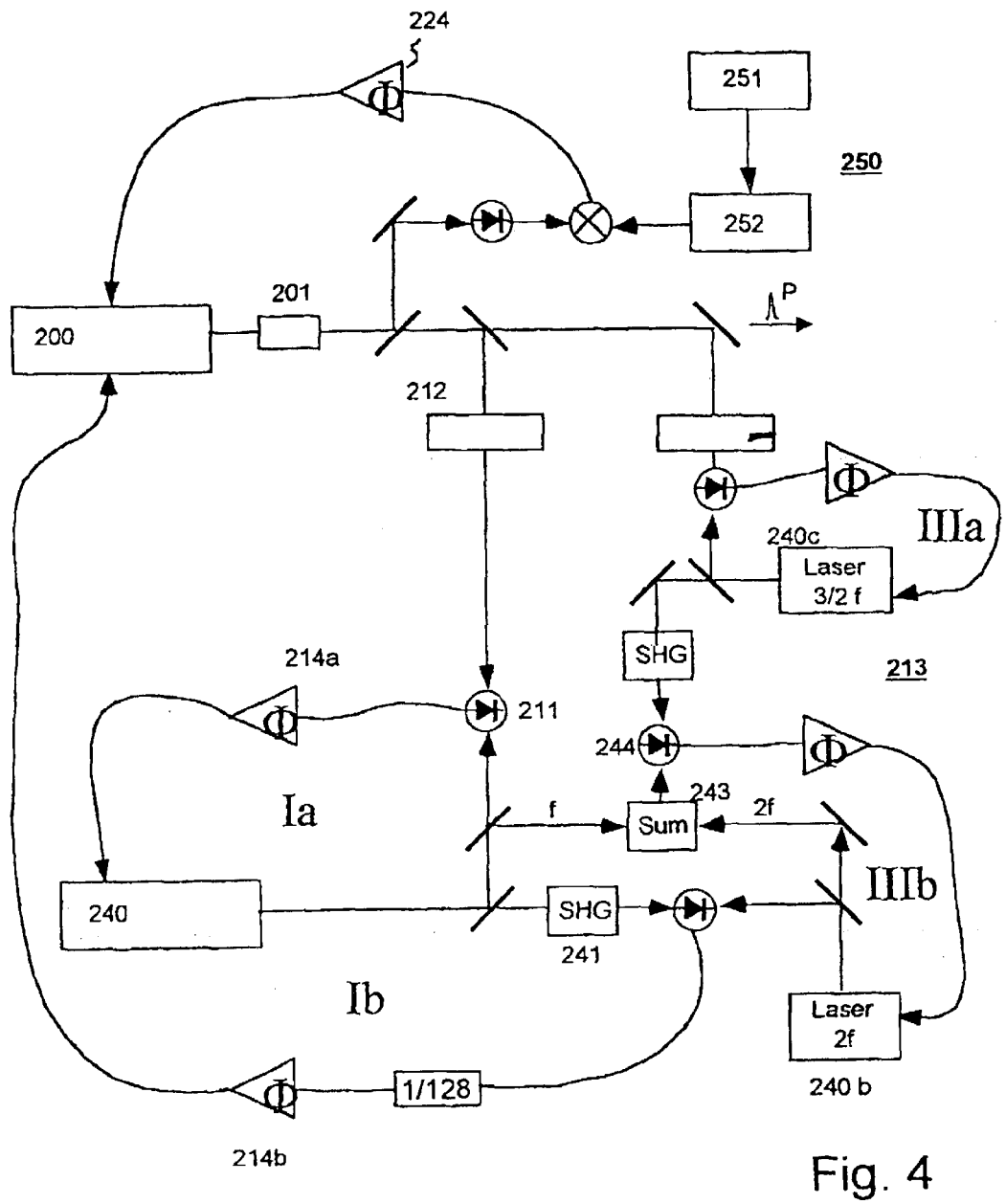

The light pulses of a laser device 200 (mode-synchronized pulse laser) are guided through an optical fiber 201 and by the mirrors 202 and 203 to the signaling elements 220 of the repetition frequency control loop II and by the mirror 204 to the signaling elements 210 of the mode control loop I. The tilted mirrors shown in FIGS. 2–4 are functionally determined partly transparent and/or dichroitic mirrors and will be hereinafter referred to collectively as mirrors. The pulses passing at the mirror 204 are partially passed through mirror 206 as output light pulses P or guided to the signaling elements 230 of the reference laser control loop III.

Depending upon each application, light is coupled out from a part of the light path in the depicted scheme for further use. This coupling out takes places for example as shown at mirror 205 or between the reference laser 240 for optical frequencies and the mirror 207.

The reference laser 240 is generally referred to as an optical reference frequency generator 240. A narrow band continuous wave laser is preferred, whose optical frequency is known with sufficient accuracy or which is stabilized with the reference laser control loop III. In case control loop III is not implemented, the reference laser 240 includes for example a methane stabilized helium neon laser. In the example shown, the first reference mode has a frequency of about 350 THz, and the helium neon laser has a frequency of about 88 THz, so that two multiplicator stages for frequency adaption (total: factor 4, see reference numbers 92, 93 in FIG. 9) are provided for. FIG. 2 further shows a reference frequency generator 250 for radio frequencies. This includes for example a cesium atomic clock 251 with a characteristic frequency of 9.2 GHz and a frequency synthesizer 252 for the production of reference frequencies derived in relation to the atomic clock.

The elements shown in FIG. 2 work together in the stabilization of laser device 200 as follows. In the mode control loop I, the output pulses of the laser device 200 are directed to the light sensitive element 211 over the mirror 204 and the elements 210. Further, light with a reference frequency $f_{ref}$ is directed to element 211. The reference frequency $f_{ref}$ is the output frequency of the reference laser 240 (or an even number multiple and/or fraction thereof) or a double frequency mode of the original mode comb (see below), whereby the frequency is doubled with a SHG device 241'. The reference frequency is also directed to the light sensitive element 211 over the mirror 207. The light sensitive element 211 serves the purpose of detecting the beat frequency between a reference mode of the output pulse and the reference frequency. To this end, both parts are superposed as known using polarizing dividers. The light sensitive element 211 is, particularly depending on the given spectral range, a photodiode or a photomultiplier.

The electrical output signal of the light sensitive element 211 contains the characteristic beat signal, formed by the overlapping of the optical frequency of the selected reference mode within the frequency comb of the output pulses of the laser device 200 and the named reference frequency. The beat signal is given as a control signal to the mode control 214, which emits an output signal for the activation of the dispersion setting device of the laser device 200, which is pivotional apparatus 7 (or one of the apparatuses 8, 8', see FIG. 1). The output signal may also be used alternatively for the setting of the sliding mechanism 5 (see FIG. 1) or for the regulation of the reference laser (see FIGS. 3 and 4). The control 214 is built in the known fashion as analog or digital control. The mode control loop I forms a PLL-loop.

In order to obtain the optimal beat signal for regulation, on the one hand a suitable (reference) mode of the frequency comb of the output pulses is chosen. To this end, depending on the application, a frequency selective element 212 (for example an optical lattice) may be provided for, in order to direct a certain spectral component of the output pulses to the light sensitive element 211. This serves only to improve the signal-noise relationship and is not absolutely necessary, however. On the other hand, the output frequency of the reference laser 240 possibly is not used as a reference frequency itself, but rather additionally adjusted to the available mode.

Figure 13:
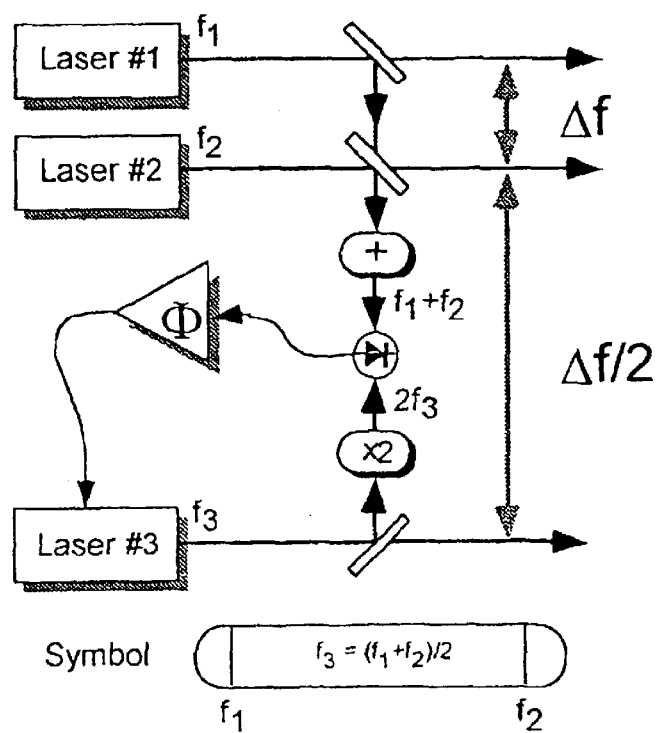
FIG. 13 an optical frequency scaling stage (prior art).

This adjustment comprises, in particular in relation with the reference laser control explained below, a multiplication and/or a division of the output frequency for obtaining the reference frequency $f_{ref}$. The multiplication produces a reference frequency $f_{ref}$ within the range of the frequency comb. The reference laser control couples a multiple (for example, the double) of the output frequency of the reference laser 240 to a further reference mode of the frequency comb with the distance (for example distance $f_{ref}$) from the first reference mode. The division is sometimes necessary in case the frequency comb is not wide enough and shows no usable reference mode at 2 $f_{ref}$. The division occurs with the scaling stage 213, which is essentially built corresponding to the divider of FIG. 13.

Figure 12:
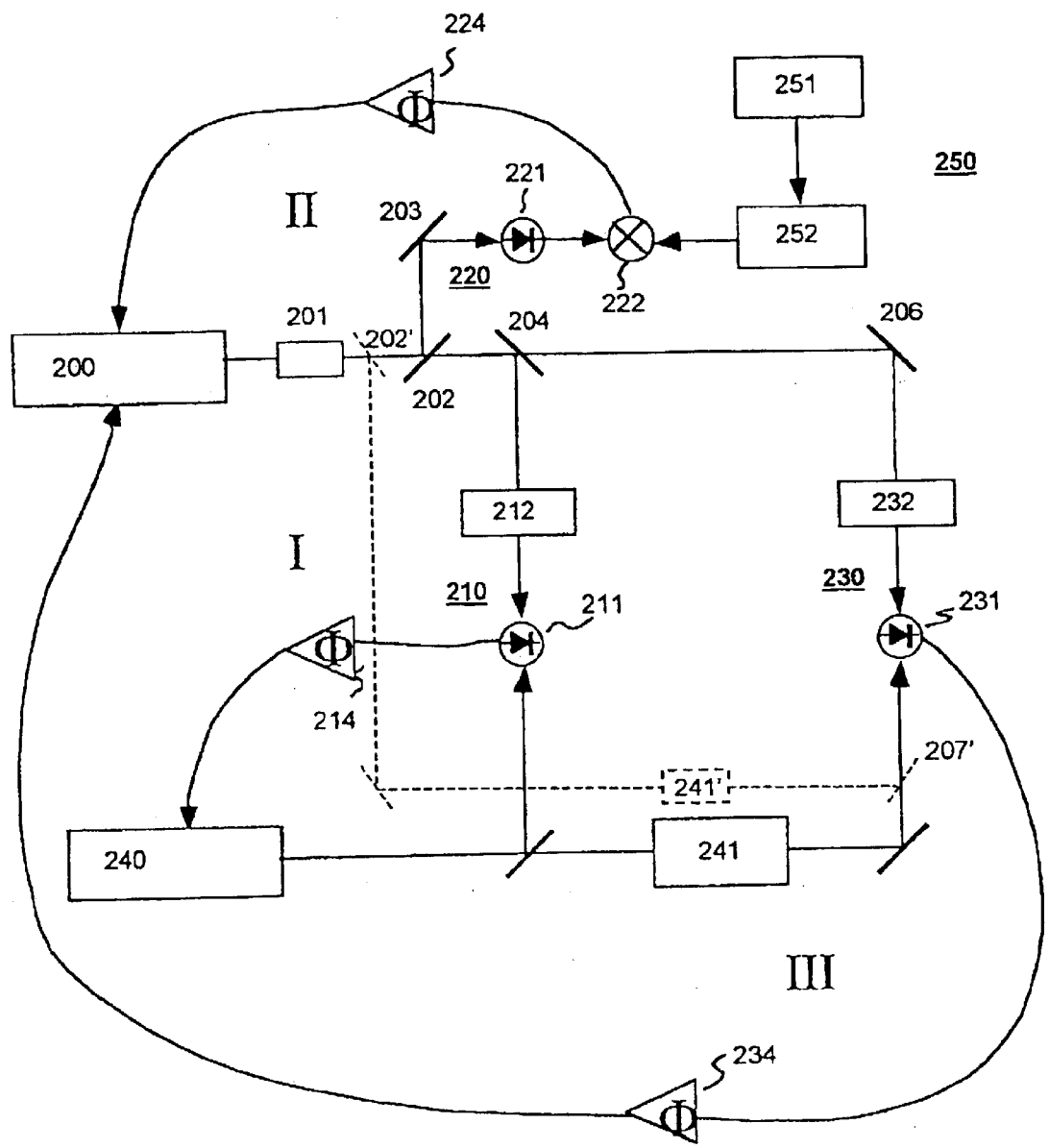
FIG. 12 a further embodiment of a stabilized laser apparatus according to the invention.

If the mode comb emitted at the output of the fiber 201 is sufficiently broad and especially if it encompasses an entire frequency octave (f and 2f) or more, the multiple mode of the mode comb may be used as a reference frequency $f_{ref}$. This variation is shown in FIG. 12 with dotted lines in elements 202', 207' and 241'. The element 202' is a dichroitic mirror, that diverts low frequencies of the mode comb and lets pass through high frequencies. One or more modes of the frequency comb are doubled in frequency with the SHG apparatus 241' (for example KDP or KnbO$_3$ crystal). The number of the doubled frequency modes depends on the parameters of the SHG apparatus. If the phase adjustment in the SHG apparatus is effective for example over 2 to 3 nm, up to 1000 modes may be doubled in frequency. Correspondingly, a large number of higher frequency modes of the mode comb may be taken into account with the beat measurement at the light sensitive element 231. An advantageous increase in intensity of the beat measurement and with it increased accuracy in control loop I result.

The use of a lower frequency mode as reference for the beat measurement is based on the following considerations. The lower frequency mode (for example $f_N$) differs from the mth higher frequency mode $f_z$ by $mf_r$, given a mode separation distance of $f_r$. An m is chosen for which the following applies: $f_z = f_{N+mfr} = 2 f_N + \Delta$. For the beat frequency, one obtains $\Delta = f_z = 2 f_N$. The laser device is stabilized on the basis of this beat frequency.

The element 241 is omitted in the implementation of beat measurement of lower frequency, multiplied moths with higher frequency modes. The connection of the reference laser 240 may however, depending on the application, be necessary for the provision of a stabilized laser.

The explained principle may also be reversed, so that a beat measurement of higher frequency, divided modes with lower frequency modes takes place.

The mode control 214 functions so that a beat signal is minimized or has a fixed beat frequency. In the latter case, the signal of a local oscillator (for example from generator 250) or a signal derived therefrom are used as a control input. With the mode control, the selected first reference mode of the frequency comb is set on a fixed frequency distance relative to the reference frequency $f_{ref}$, or, reversed, the reference frequency $f_{ref}$ is set on a fixed frequency distance relative to the reference mode. The fixation of a frequency comb mode can be done with an extraordinarily high relative accuracy. Which prefix the frequency distance of the reference mode from the reference frequency has may be deduced from the behavior of the control 214.

During dispersion control with the mode control loop I, the position of the frequency comb in relation to the reference frequency is controlled through the fixation of a chosen mode, whereby the mode distance of all modes of the output pulses is also changed. In order to set the desired mode distance with the fixed reference mode, dependent upon the application, the group circulation time, more specifically the effective resonator length of the pulse laser, is adjusted with the repetition frequency control loop II. The output pulses are directed over the mirror 202 to the elements 220 in the repetition frequency control loop II. The electrical output pulse of the photosensitive element 221 (photodiode or photomultiplier) is electronically mixed as a basis frequency or as a higher harmonic (for example $100^{th}$ or $200^{th}$ harmonic) from the output pulse at the mixer 222 with the signal of the reference frequency generator 250 for microwave or radio frequencies, whereby a differential or beat frequency is formed between the pulse repetition frequency $f_r$ of the output pulses (or their higher harmonics) and the radio frequency, both of which lie in the GHz range. This beat signal is used as a control input of the (repetition frequency) control 224 for the adjustment of the resonator length, for example at the sliding drive 5 according to FIG. 1, or at coupling of the mode control 214 with the resonator length adjuster for the control of the dispersion. The signal of the local oscillator serves as the control input just as with the mode control 214. Alternatively a minimalization of the beat signal takes place. A complete stabilization of the output pulses of the laser device 200 relative to the reference laser 240 takes place through the fixed setting of the repetition frequency $f_r$ of the output pulses and thereby of the mode distance on the one hand and the frequency of a chosen mode on the other hand.

The mutual dependency of the working together of the mode and repetition frequency control loops I and II is significant. While the mode control loop I permits the absolute setting of a first reference mode, both the pulse repetition frequency $f_r$ (corresponding to mode distance) as well as the frequency positions may be changed with the repetition frequency control loop II through a variation of the resonator length. If the pulse repetition frequency $f_r$ is fixed through the repetition frequency control loop II, the frequency positions of the modes are defined with the mode control loop I. If the frequency positions of the modes are fixed with the repetition frequency control loop II, pulse repetition frequency $f_r$ is changed with the mode control loop I. Deviating from the configuration described above, it is thus possible in the alternative that the control 214 controls the resonator length setting and the control 224 controls the dispersion setting.

Control loops I and II do permit a complete laser stabilization with relation to the reference laser 240. The stabilization is thus dependent upon the accuracy of the optical reference frequency generator and, in the given circumstances, upon the frequency multiplication. The reference laser 240 represents for precision applications a separately stabilized and nevertheless relatively inaccurate, voluminous and sensitive apparatus. In accordance with an embodiment preferred for practical applications, particularly outside the laboratory, the stabilization of the optical reference frequency generator itself with the stabilized output pulses of the laser device 200 is provided. To this end, reference laser control loop III is provided, functioning as follows.

The complete system represented in FIG. 2 possesses three degrees of freedom in relation to the operation of the laser device 200 and the reference laser 240. These degrees of freedom encompass first the position of the first reference mode at a certain optical frequency, second the mode distance corresponding to the pulse repetition frequency $f_r$ in the radio frequency range and third the frequency of the reference laser 240. The pulse repetition frequency $f_r$ and the absolute mode position in the resonator may be adjusted through the resonator length and/or through the linear dispersion of the laser device 200. A higher frequency reference mode of the stabilized frequency comb is used for the regulation of the reference laser 240, more specifically for the derivation of a frequency normal for the same. A control loop is provided for each of the three degrees of freedom The mode and repetition frequency control loops I and II use the optical reference frequencies or the radio reference frequencies of the reference frequency generators 240 or 250, as references. In the third control loop the control principle is reversed: the optical reference frequency is regulated to a certain value. To this end, a beat signal derived from two optical frequencies is used as a regulating unit. The first frequency is derived from the optical reference frequency $f_{ref}$ itself, while the second frequency is given by a further reference mode in the frequency comb of the output pulses, which has a predetermined reference distance from the mode set in mode control loop I, or a higher harmonic or fraction of the frequency of this reference mode.

The reference laser control loop III contains, according to FIG. 2, the light sensitive element 231 and the frequency selecting element 232 as signaling elements 230. Output pulses of the laser device 200 are directed over the mirror 206 and the frequency selecting element 232 (e.g. optical grid) on to the light sensitive element 232. At the same time this receives a frequency doubled signal from reference laser 240, which is formed after the passage over the mirror 207 in the SHG device 241 (device for the generation of the second harmonic, for example KDP- or $KNbO_3$ crystal) and directed over the mirror 208 to the light sensitive element 231. The light sensitive element 231 is in turn a photodiode or a photomultiplier. Since higher optical frequencies and therefore shorter wavelengths are processed in reference laser control loop III than in mode control loop I, a photomultiplier is preferred as the light sensitive element 231.

Figure 5:
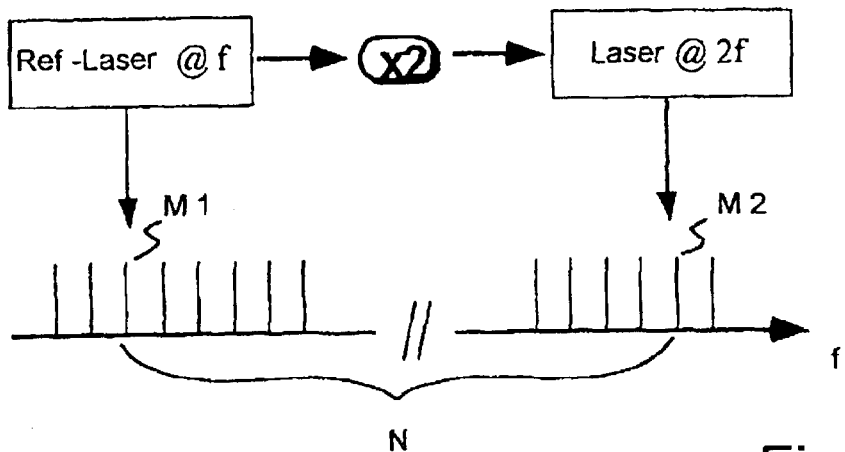
FIGS. 5–8 illustrations of phase coupling in the stabilization of a laser device according to the invention.

The regulation in the third control loop III is based again on the observation of a beat signal, which is generated through the superposition of the frequency doubled reference frequency with the higher frequency reference mode of the output pulses. As is schematically illustrated in FIG. 5, the higher frequency mode $M_2$ of the output pulses possesses a defined frequency separation in relation to the fixed relation mode $M_1$ set in the mode control loop I. The frequency separation corresponds to the product of the mode number N between the reference modes $M_1$ and $M_2$ in mode control loop I and reference laser control loop III and the mode separation between two individual modes $f_r$, which is determined by the repetition frequency control loop II. The mode number between the reference modes is ascertained by a mode counter 250. The function of the mode counter is explained below. Alternatively, the determination of the absolute position of the higher frequency reference mode $M_2$ is also possible through the comparison with a nearby, exactly known atomic resonance or, with sufficiently large pulse repetition frequencies (more than 300 MHz) through direct measurement of the modes with a wave meter (for example of the Burleigh-WA1500 type).

The electrical initial signal of the light sensitive element 231 possesses a signal portion that oscillates with the differential or beat frequency δf of the doubled reference frequency $[2f_{ref}=2(M_1 \cdot f_r+f_p)]$ and the frequency of the reference mode at $M_2$ $(M_2 \cdot f_r+f_p)$, which is processed as a regulating variable in the (reference laser) control 234. If the reference frequency $f_{ref}$ is changed by Δf, the contributions to the beat oscillation change correspondingly by 2Δf or Δf.

For δf, it follows if $M_2=2M_1$:

$$\delta f=2f_{ref}-(M_2 \cdot f_r+f_p)=2(M_1 \cdot f_r+f_p)-(2M_1 \cdot f_r+f_p)=f_p$$

The beat frequency is thus exactly the same as the slip frequency $f_p$. In order to stabilize $f_{ref}$, the beat signal δf is to be minimized to zero or adjusted with a local oscillator. The reference laser control 234 is for example arranged so that the optical frequency of the reference laser 240 is regulated with a reference laser control so that the beat frequency corresponds to a predetermined value. If the reference laser 240 is a diode laser, it will be electrically stabilized with the control 234 or stabilized with an external movable grid serving as a regulating device. In the case of a diode pumped solid state laser as reference laser 240, a stabilization is achieved with a Piezo control serving as a regulating device of the resonator length or with an electro optical modulator. The particular advantage of the construction with the three control loops is that no particularly great self-contained stability is required of the reference laser 240. The reference laser 240 is nevertheless stabilized in the frequency space through the accuracy of for example $10^{-14}$ given by the radio frequency generator 250. With reference to optical frequency standards a relative stabilization accuracy up to $10^{-18}$ could be expected. A reference frequency generator may be utilized whose frequency is adjusted to the measuring problem. Thus a frequency generator may is provided with this complete apparatus that is useful for many applications in practice and not limited to laboratory use.

The mode counter 260 functions according to the following principle. For counting the modes, a thinning out of the closely neighboring modes within the frequency comb into a stretched out frequency range is provided, in which the modes may be measured with a commercially available wavemeter. To this end, the mode counter 250 contains a passive resonator with a free spectral range expanded in relation t the resonator of the laser device 200. A spectral range expanded 20 times is provided for, for example. In this resonator correspondingly only every twentieth mode is transmitted so that a stretched ode separation is formed (for example 1.5 GHz). This corresponds in a time picture to a twenty times lower pulse separation T. The same regulation with the reference frequency generator 240 and its doubled frequency signal (after 241) follows with the thinned out frequency comb as with the original comb corresponding to the reference laser control loop. Two beat signals are produced whose separation may be evaluated with the wavemeter. The frequency positions of the reference modes and the number of modes lying between them may be deduced through this frequency measurement and the known mode thinning in the passive resonator of the mode counter 260.

An apparatus 201 subordinate to the output point of the laser device 200 for the widening of the output spectrum of the laser device 200 through self phase modulation in a nonlinear medium is illustrated in FIG. 2. This arrangement 201 is for example an optical fiber. The self phase modulation in optical fibers is described for example in K. Imai et al. "IEEE Journal of Quantum Electronics," Vol. 34, 1998, pp. 54 et seq. Depending on the power of the output pulses a spectral expansion up to a quasi white light continuum may be achieved. This becomes particularly important when the frequency comb modes has to contain the frequency f and its second harmonic 2f. In this case the construction of the control loops I and III is simplified in that the first control loop I relates to the reference mode f and the third control loop III relates to the reference mode 2f. In case the apparatus 201, is not implemented, it may be necessary to introduce dividing stapes for the achievement of the reference laser control loop III, in order to obtain a usable beat signal between the second harmonic of the optical reference frequency and a reference mode of the frequency comb or one of its frequency fractions.

The apparatus 201 is preferable designed so that a spectral widening of at least over one octave is obtained, so that the mode comb reaches from f to 2f. This is achieved for example with a so-called "Photonic Crystal Fiber", which has a fiber core and around it axially arranged microscopically small air canals (see D. Mogilevtsev et al. in "Optics Letters", Vol. 23, 1998, pp. 1662 et seq., T. A. Birks in "Optics Letters", Vol. 22, 1997, pp. 961 et seq., or T. A. Birks in "IEEE Photonics Letters", Vol. 11, 1999, pp. 674 et seq.). A fiber with a spectral widening to 2f delivers advantages for the construction of the control loops described below.

In the schematic of FIG. 2 the laser device is stabilized with relation to the reference laser 240. Conversely, it is also possible to measure the frequency of the reference laser 240 or its derived (fractional or multiple) frequencies, by phase-coupling of a laser device with stabilized operation according to the invention with a reference laser 240 and by determining the frequency of the reference laser 240 from the beat signal of the (here not regulated) reference laser control loop III. Thus the relation between the frequency of the reference laser 240 to the radio frequency generator 250 (relative accuracy at least $10^{-16}$) is established directly and with a high degree of accuracy and the desired "clockwork" for the bridging of the interval between the optical and radio frequencies is created.

Variations of the schematic of FIG. 2 are shown in FIGS. 3 and 4. Similar parts are marked with similar reference numbers. In the following, only the differences with FIG. 2 are set forth.

The mode control loop I is divided into two partial controls Ia and Ib in FIG. 3. Partial-control Ia serves to couple a first reference laser 240a, which may be a diode laser, for example, and runs at a certain frequency $f_{ref}$, with a first mode control 214a to a reference mode of the frequency comb. The other partial control Ib corresponds to the mode regulation of the laser device 200 described above on the basis of a beat signal from the doubled reference frequency $f_{ref}$ and from a second reference laser 240b run at a frequency $2f_{ref}$ and coupled to a higher frequency reference mode of the pulse frequency comb. A fraction (for:example, 1/128) of the beat frequency is added as a control variable to the second mode control 214b. Through this frequency division of the beat signal, which can also be included in the embodiment according to FIG. 2, the bandwidth of the regulation is increased by the divisional factor. In this way, the relatively narrow regulating speed (bandwidth) of the piezo drives in the laser device is compensated. The coupling of the second reference laser 240b to the mode comb in the reference laser control loop III is symmetrical to the coupling between the lower reference mode and the first reference laser 240a.

The mode control loop I is divided into two partial controls Ia and Ib also in FIG. 4 according to the principle explained above. Additionally, the reference laser control loop III is also divided into two partial controls IIIa and IIIb, of which one partial control IIIa serves for bridging between the higher frequency reference mode and the second reference laser 240b being run at 2 $f_{ref}$. The other partial control IIIb corresponds for the most part to the reference laser control III according to FIG. 3.

The partial control IIIa includes the coupling of the reference laser 240c to the higher frequency reference mode of the frequency comb. The reference laser 240c is operated at 3/2 $f_{ref}$ and includes for the significant part a scaling step according to FIG. 13. After frequency doubling of the output signal of the reference laser 240c at 242 and the summation of the output signal fret of the first reference laser 240 and the output signal 2 $f_{ref}$ of the second reference laser 240b at 243, a beat signal is produced at the light sensitive element 244, on the basis of which the second reference laser 240b is stabilized.

The application of the invention is not limited to the stabilization of a pulse laser. The principles explained with reference to FIGS. 2–4 may also be used to measure an un-known optical frequency with a stabilized laser device. Applications of the invention for the stabilization and/or measurement of optical frequencies are explained in the following examples.

EXAMPLE 1

Measurement or Synthesis of Optical Frequencies

For the first time, through use of a stabilized laser device according to the invention optical frequencies or frequency differences may be set in relation to a frequency norm (for example, an atomic clock) with an accuracy of at least $10^{-16}$ directly or with a few dividing steps (2 or 3). This means, either to start with an optical frequency (for example the measuring light of a spectroscopy laser) and put this in relation to a radio frequency normal or to start with a radio frequency and stabilize an optical frequency with it. The bridging of the frequency difference between optical frequencies and radio frequencies is explained below with reference to FIGS. 6–8.

Figure 6:
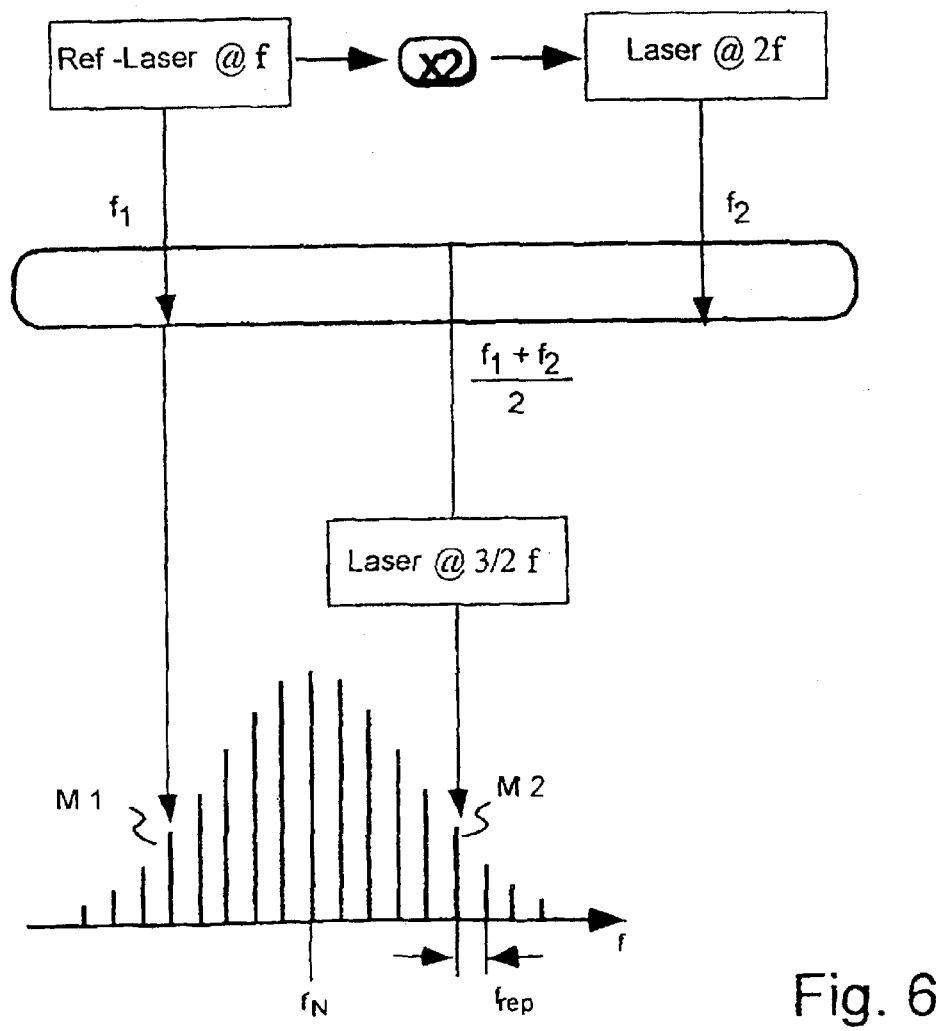

The goal of the application is, for example, in the determination or generation of the frequency f of the reference laser (see FIG. 6). The reference laser corresponds to the reference frequency generator 240 in FIG. 2. In the following, the discussion will be only with respect to determination the frequency f. For the generation of the frequency f the given principles of phase coupling will be carried out in reverse.

The frequency f is measured according to FIG. 6 through the determination of the frequency difference between f and 2f (2f−f=f). The frequency difference f is captured through a comparison with a frequency comb of a laser device stabilized according to the invention. The frequency differences that may be bridged with a frequency comb depend upon the pulse length of the output pulses of the laser device and are for the above example (laser device construction according to FIG. 1 with approx. 73 fs) up to 20 THz, with use of the fiber 201 at least 50 THz or with pulse lengths of approx. 10 fs up to 100 THz. The widening achieved with fiber 201 depends also from the pump power of the active medium of the pulse laser. For optical frequencies of approx. 300 THz a division of the frequency difference f must therefore be carried out with the available technology, until it lies within the frequency comb. If the pulses are short enough, the division of the optical frequencies may be omitted.

With the techniques described, a reference laser with f is placed in relation to a lower reference mode Ml of the frequency comb. The frequency gap between f and 2f is divided to a frequency gap between f and 3/2f through use of a dividing stage according to FIG. 13. The frequency difference f/2 lies within the frequency comb. The frequency 3/2f is put in relation to an upper reference mode $M_2$ of the frequency comb. It is ascertained which modes being to f or 3/2f using the mode separation stabilized according to the invention with relation to an atomic clock and therefore known, and the beat frequencies, and the sought frequency f is deduced after counting out of the modes. Alternatively, depending on the application, intervals for example between 4f and 7/2f may also be bridged (see FIG. 11).

Figure 7:
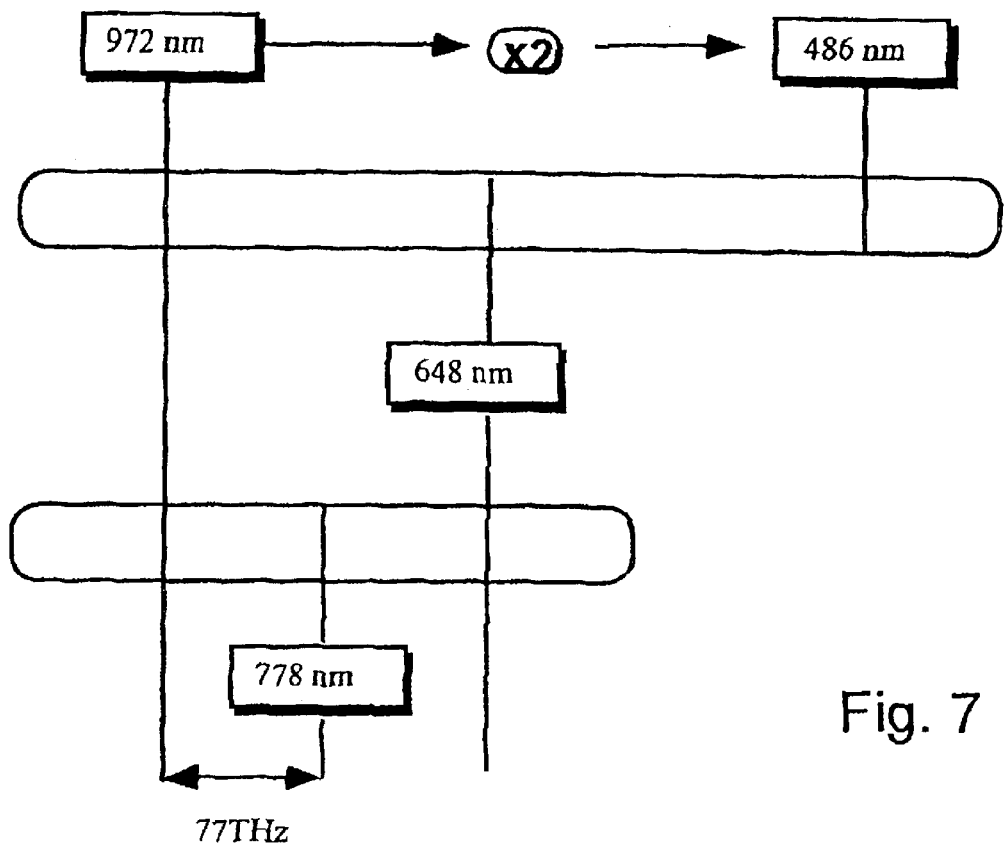
Figure 8:
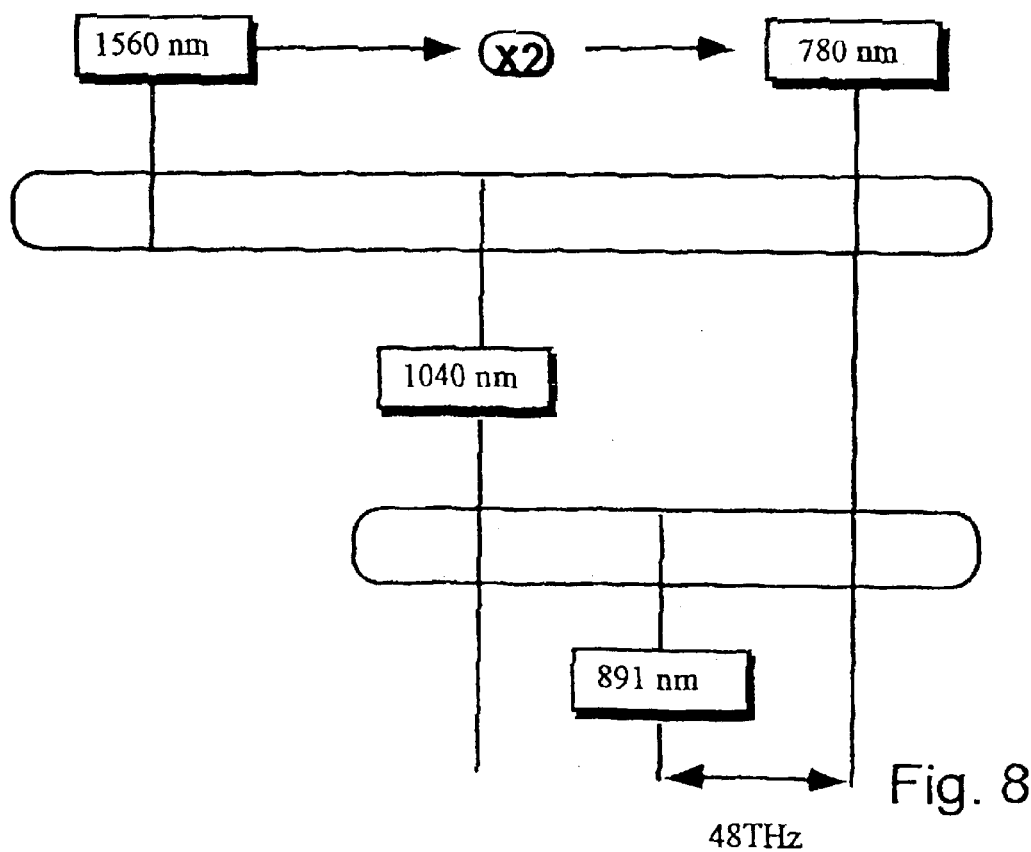

Which frequencies f or 2f of the reference modes $M_1$ or $M_2$ are used as a connecting point for the frequencies to be measured or produced, depends on the specific application and the corresponding wavelengths. This is illustrated in FIGS. 7 and 8. According to FIG. 7, with the measurement of a reference laser at λ=972 nm after doubling and twofold division of the frequency interval of approx. 330 THz, one reaches a wavelength λ=778 nm which has a separation of 77 THz from λ=972 nm. Depending on the available frequency comb, a further division must follow. According to FIG. 8, by contrast, there is an interest in the measurement of a reference laser with λ=1560 nm. In this case, one latches on to the doubled frequency at λ=780 nm. After two dividing steps, an interval is obtained between λ=780 nm and λ=891 nm with 48 THz, which can be bridged with a 50 THz comb without further dividing steps.

The dividing chain can thus relate either to the upper (2f) or lower (f) starting frequency. Further, the choice of starting frequency is important for the frequency difference to be achieved with few scaling stages. For frequencies, for example, in a relevant wavelength range from approx. 700 nm to 1700 nm, the scaling stages may be chosen so that the connection to the frequency comb of the laser device is optimized. The range around λ=1560 nm is of particular interest for applications of the invention in the area of telecommunications.

Through advantageously relating the reference frequency to an atomic clock working with the accuracy of $10^{-14}$, rather than to a stabilized helium laser with an accuracy of $10^{-13}$, the order of magnitude of accuracy of the setting of the laser device with a significantly simplified construction is attained.

APPLICATION EXAMPLE 2

Measurement of Frequency Differences

Figure 9:
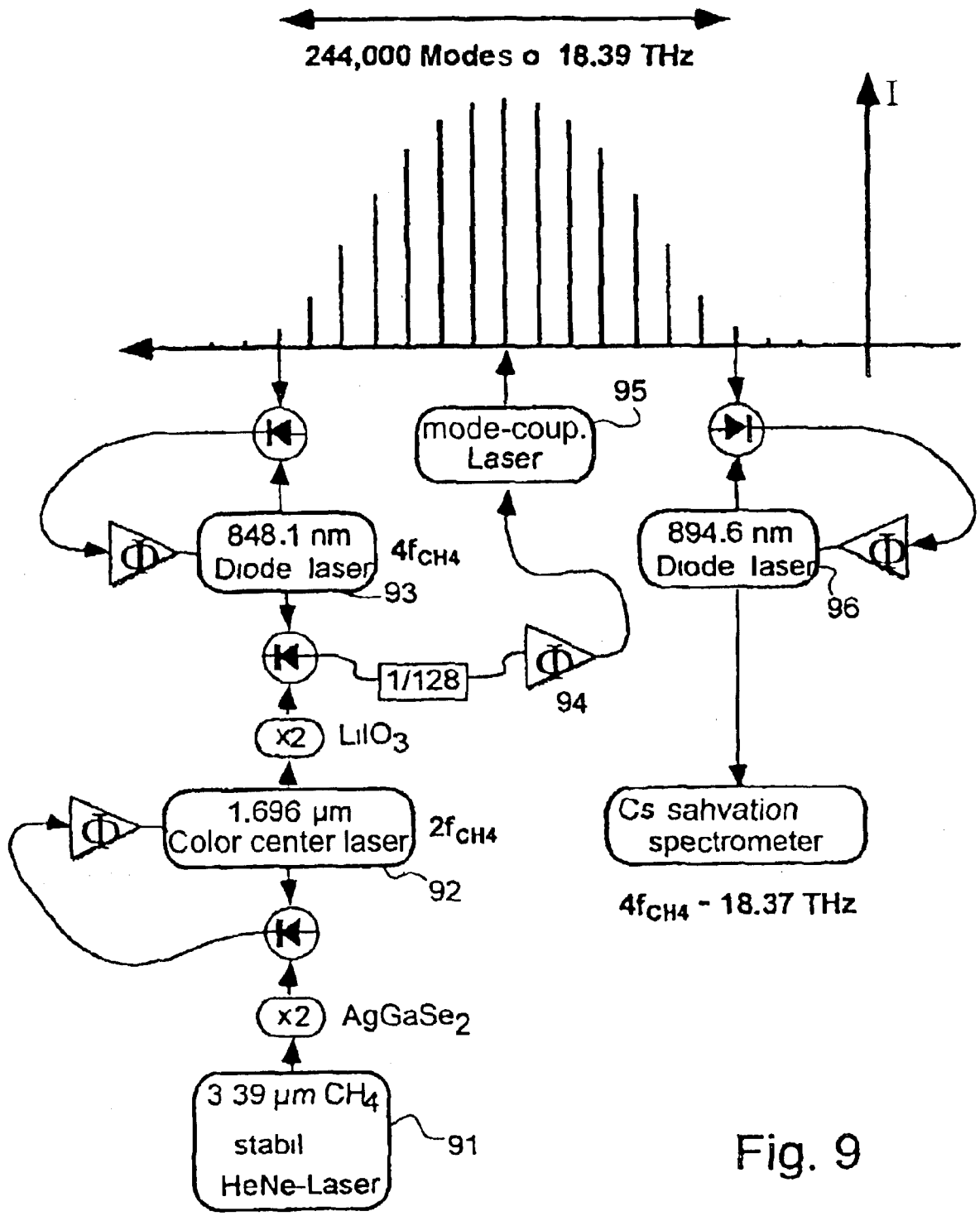
FIGS. 9–11 illustrations of the use of the invention for spectroscopic measurements or time measurements.

The application of the invention in the area of precision spectroscopy is based on the application of a laser device stabilized according to FIGS. 2–4 with the mode and repetition frequency control loops for the measurement of the frequency gap between a reference laser and spectroscopy laser. To this end, the reference laser control loop (III) is not required. Measurements were carried out, for example, with a laser device according to the invention of the $D_1$ line of cesium at 335 THz (895 nm). This followed through the determination of the frequency separation between the multiplied frequency of a methane stabilized helium neon laser (4·88.4 GHz=354 THz) and the $D_1$ line through use of a frequency comb with about 244000 modes of a stabilized titanium sapphire laser. The measuring principle is illustrated in FIG. 9. The frequency comb is shown schematically in the upper part of FIG. 9, which extends over 18.39 THz with 244000 modes. The phase coupling of the frequency comb follows at its lower frequency end to a specifically known mode $M_1$ on the basis of the output frequency of the helium neon laser 91. First, a color center laser 92 is stabilized with the helium neon laser 91 according to the beat signal control principle explained above, whose doubled output frequency is in turn used to stabilize a diode laser 93. Simultaneously, the setting of the mode coupled pulse laser 95 follows over the control 94 (Φ) as with the stabilization shown in FIG. 2.

At the high frequency end of the frequency comb, the diode laser 96 is coupled to a suitable reference mode $M_2$, whereby the number of modes in relation to the lower frequency reference mode is counted out according to the method set forth above. Through the introduction of a defined offset frequency, varying around 1 MHz in a 100- to 200-kHz range with relation to the frequency of the laser 92, the frequency of the diode laser 96 can be turned through a corresponding shift of the mode comb.

Figure 10:
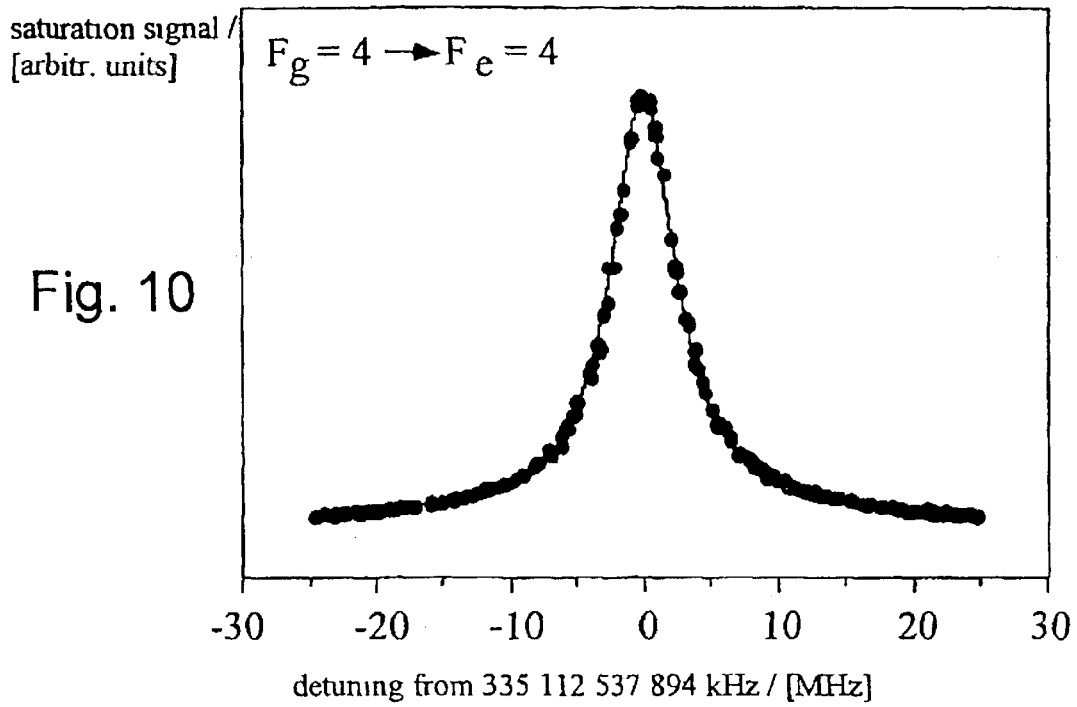

In order to measure the $D_1$ cesium line in a saturation spectrometer (for example, with two linearly polarized, oppositionally running laser beams of the same intensity, for example 10 $\mu W/cm^2$, cesium cell, length: 7.5 cm, room temperature), tuning of the diode laser 96 over the line contour is obtained. Details of the known methods of saturation spectroscopy are not given here. FIG. 10 shows, for example, the course of the transition $F_q=4 \rightarrow F_e=4$ of the $D_1$ line. The location of the middle frequency can be given with a hitherto impossible degree of accuracy through the setting of the corresponding beat frequencies at the phase coupling of the frequency comb and the number of the modes between the upper and lower reference modes. This is significant for both for the highly accurate determination of substance properties and also for the more accurate measurement of fine structure constants α.

Figure 11:
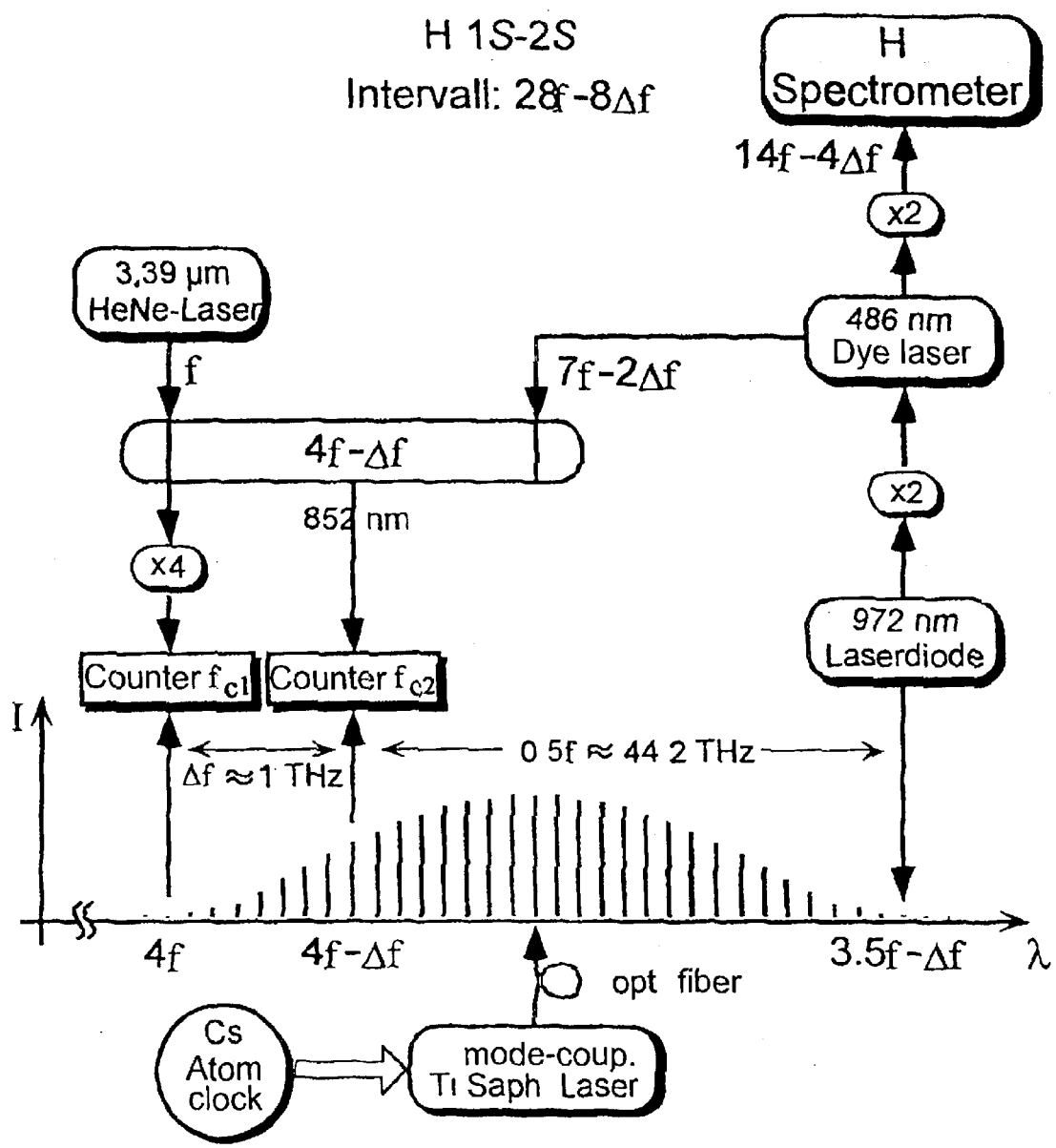

FIG. 11 illustrates a frequency chain for the precision measurement of the hydrogen-1S-2S-transition with lasers stabilized according to the invention. This frequency chain is an example for the bridging of a frequency interval between 4f and 7/2f. The absolute frequency of the 1S-2Stransition (ca. 2466 THz=28f–8Δf) is converted in frequency intervals of magnitude 0.5 f and Δf, which are measured with the stabilized titanium sapphire laser and directly placed in relation to the frequency of the Cs atomic clock.

Further Applications

Besides the stabilization or measurement of optical frequencies for frequency and/or time measurement purposes, there are also applications of the laser stabilization according to the invention in the area of telecommunications. With the standard transmission of a number of carrier frequencies, until now frequency differences between the carrier frequency bands in the order of magnitude of 100 GHz were required for optical data transmission. This limits the number of frequency bands that may be placed on the transmitter and with it the transmission capacity. A narrower arrangement of the frequency bands with separations under 10 GHz are made possible through a laser device stabilized according to the invention, whereby this value depends also on the amount of information transmitted.

Further, for the future production of "optical" atomic clocks, which run more accurately by several orders of magnitude than the Cs atomic clocks used until now, a new reference point is created for the measurement of optical frequency gaps, which may make the implementation of the reference laser control loop for the measurement of optical frequencies unnecessary.

The desired "clockwork" is ready for operation with a complete stabilization of the control loops I, II and III, with which the frequency distance between radio frequencies and optical frequencies may be bridged, in particular in order to provide an optical frequency, which is stabilized with a radio frequency normal or in order to produce a radio frequency which is stabilized in relation to an optical frequency normal. Further applications exist in all areas of frequency and time measurement technology, in which only the frequency dividing steps described at the outset have been available to this point.

The characteristics of the invention disclosed in the foregoing specification, the drawings and the claims may be of importance either separately or in any combination for the realization of the invention in its various forms.

What is claimed is:

1. A process for the operation of a laser device having a resonator configuration with a light path, comprising the steps of:

generating light pulses circulating in the resonator configuration, said light pulses consisting of spectral components corresponding to multiple longitudinal modes of the resonator configuration;

compensating for the group velocity dispersion of said light pulses; and inputting a predetermined linear dispersion into the light path of the resonator configuration, so that at least one mode possesses a predetermined frequency or the mode separation between the modes possesses a predetermined value;

said step of inputting a predetermined linear dispersion comprising at least one of a tilting of a transparent plane, a pushing in of a pair of prisms in the light path of the resonator configuration, a setting of the effective pumping power for the pumping of the active medium of the laser device, or a change of the geometric configuration of the laser device relative to a pump laser.

2. A process for the operation of a laser device having a resonator configuration with a light path, comprising the steps of:

generating light pulses circulating in the resonator configuration, said light pulses consisting of spectral components corresponding to multiple longitudinal modes of the resonator configuration;

compensating for the group velocity dispersion of said light pulses; and inputting a predetermined linear dispersion into the light path of the resonator configuration, so that at least one mode possesses a predetermined frequency or the mode separation between the modes possesses a predetermined value;

said step of inputting a predetermined linear dispersion comprising changing a spectrally specific effective resonator length in a resonator branch, through which the light pulses traverse spectrally spatially separated after the compensation of the group velocity dispersion.

3. Process according to claim 1 or 2, in which the linear dispersion is introduced into the resonator configuration (3) within the framework of a mode control loop (I) dependent upon the frequency deviation of at least one first reference mode ($M_1$) of the light pulses from a reference frequency ($f_{ref}$), which is the output frequency of an optical reference frequency generator (240), a higher harmonic or an even number fraction of the output frequency or of the higher harmonic, a frequency multiple of a lower frequency reference mode of the light pulses, or a fractional frequency of a higher frequency reference mode of the light pulses.

4. Process according to claim 3, whereby in the mode control loop (I) light pulse of the laser device (1) and light with the reference frequency ($f_{ref}$) are superposed and directed to a photosensitive element (211), whose electrical output signal shows a modulation at a beat frequency corresponding to the distance of the frequency of the first reference mode ($M_1$) from the reference frequency ($f_{ref}$), whereby a control (214) is provided, which sets the linear dispersion of the resonator configuration (3) so that the beat signal is minimal or possesses a predetermined beat frequency.

5. Process according to claim 4, whereby the optical reference frequency generator (240) is a stabilized continuous wave laser.

6. Process according to claim 3, whereby the optical reference frequency generator (240) is stabilized in a reference laser control loop (III) in relation to a second higher frequency reference mode ($M_2$) of the light pulses.

7. Process according to claim 1 or claim 2, whereby the liner dispersion is introduced into the resonator configuration (3) within the framework of a mode control loop (Ia, Ib) depending upon the deviation of the multiplied frequency of a first reference laser (240a), which is phase coupled with a first lower frequency reference mode ($M_1$) of the light pulses, from the frequency of a second reference laser (240b), which is phase coupled in a reference laser control loop (III) with a second higher frequency reference mode ($M_2$) of the light pulses.

8. Process according to claim 7 whereby the second reference laser (24 Gb) is phase coupled with the second higher frequency reference mode (M2) of the light pulses through a scaling stage.

9. Process according to claim 1 or 2, whereby the resonator length of the laser device (1) is regulated within the framework of a repetition frequency control loop (II), in which the repetition frequency ($f_r$) of the light pulses is superposed with a radio frequency derived from a radio frequency generator reference (25), whereby a control (224) is provided for, which sets the resonator length of the laser device (1) so that the oscillating signal formed by the superposition is minimal or possesses a predetermined beat frequency.

10. Process according to cliam 1 or claim 2 whereby the liner dispersion is introduced into the resonator configuration (3) within the framework of a repetition frequency control loop (II), in which the repetition frequency ($f_r$) of the light pulses is superposed with a radio frequency derived from a radio frequency reference generator (25), whereby a control (224) is provided for, which sets the resonator length of the laser device (1) so that the oscillating signal formed by the superposition is minimal or possesses a predetermined beat frequency.

11. Process according to claim 10, whereby the resonator length of the laser device (1) is regulated within the framework of a mode control loop (I) dependent upon the frequency deviation of at least a first s mode ($M_1$) of the light pulses from a reference frequency ($f_{ref}$), which is the output frequency of an optical reference frequency generator (24) or a higher harmonic or an even number fraction of the output frequency or the higher harmonic.

12. Process according to claim 10, whereby the resonator length of the laser device (1) is regulated within the framework of a mode control loop (I) dependent upon the frequency deviation of at least a first reference mode ($M_1$) of the light pulses from a reference frequency ($f_{ref}$), which is the output frequency of an optical reference frequency generator (24) or a higher harmonic or an even number fraction of the output frequency or the higher harmonic.

13. Process according to claim 10, whereby the resonator length of the laser device (1) is regulated within the framework of a mode control loop (I) dependent upon the frequency deviation of at least a first reference mode ($M_1$) of the light pulses from a reference frequency ($f_{ref}$), which is the output frequency of an optical reference frequency generator (24) or a higher harmonic or an even number fraction of the output frequency or the higher harmonic.

14. Application of a process or a laser device according to claim 2 for the measurement of optical frequencies of frequency differential generation of optical frequencies, bridging of large frequency differences in optical division chains, generation of optical transmitting frequencies in telecommunications technology, spectroscopic measurement of atomic electronic transitions, or the bridging of the frequency of an optical frequency normal to a measuring frequency that may be counted with electronic means.

15. A laser device for production of short light pulses, having a resonator configuration with an active medium;

a resonator formed with an optical fiber or with a plurality of mirrors, including an incoupling mirror for the coupling in of pump light to the active medium and two or more tilted mirrors for directing resonating light to an outcoupling mirror for the output of light pulses;

a compensating mechanism for the compensation of the group velocity dispersion of the light pulses;

a dispersion setting device for the input of a predetermined linear dispersion into the light path of the resonator configuration; and said dispersion setting device comprising at least one of a transparent plate with a tilting mechanism, a pair of prisms with a sliding mechanism, which are included in the resonator configuration, an apparatus for the variation of the effective pump power of a pump laser, or an apparatus for the variation of the geometrical configuration of the laser device relative to the pump laser.

16. A laser device for production of short light pulses, having a resonator configuration with an active medium;

a resonator formed with an optical fiber or with a plurality of mirrors, including an incoupling mirror for the coupling in of pump light to the active medium and two or more tilted mirrors for directing resonating light to an outcoupling mirror for the output of light pulses;

a compensating mechanism for the compensation of the group velocity dispersion of the light pulses;

a dispersion setting device for the input of a predetermined linear dispersion into the light path of the resonator configuration; and said dispersion setting device comprising a pivoting mechanism on a tilted mirror functioning as a resonator end mirror and being located in a branch of the resonator on the side of the compensating mechanism facing away from the active medium.

17. Laser device according to claim 15 or claim 16, which is constructed as a ring laser.

18. Laser device according to claim 17, whereby a resonator length setting device (5) is provided for the change of the resonator length through a change in positioning of one of the tilted minors (33b).

19. Laser device according to claims 15, 16 or 18 whereby a mode control loop (I, 210, 214) is provided for the regulation of the dispersion setting device (7, 8, 8') or the regulation of the resonator length setting device (5), dependent upon the frequency deviation of at least one frequency component of the light pulse from a reference frequency ($f_{ref}$), which is the output frequency of an optical reference frequency generator (240) or a higher harmonic or an even number fraction of the output frequency or of the higher harmonic or a multiplied frequency of a lower frequency reference mode or a divided frequency of a higher frequency reference mode of the light pulses.

20. Laser device according to claim 19, whereby the mode control loop (I, 210, 214) includes an apparatus (211) for the production of a beat signal from the frequency component of the light pulses and the reference frequency ($f_{ref}$) and a mode control (214) for the dispersion setting device (7) or the resonator length setting device (5), so that the dispersion setting device (7) or the resonator length setting device (5) is activated in such a way that the beat signal is either minimal or possesses a predetermined beat frequency.

21. Laser device according to claim 19, whereby the mode control loop (I, 210, 214) includes an apparatus (211) for the production of a beat signal from the frequency component of the light pulses and the reference frequency ($f_{ref}$) and a mode control (214) for the dispersion setting device (7) or the resonator length setting device (5), so that the dispersion setting device (7) or the resonator length setting device (5) is activated in such away that the beat signal is either minimal or possesses a predetermined beat frequency.

22. Laser device according to claim 21, whereby a filter element (212) for spectral selective detection of the light pulses is provided at the photosensitive element.

23. Laser device according to claim 19, whereby further a reference laser control loop (III, 231) is provided for the regulation of the optical reference frequency generator or reference laser (240), with a device (231) for the generation of a beat signal from a higher frequency component of the light pulses or a part of tis frequency component and a frequency equal to a multiple of the reference frequency ($f_{ref}$), and a setting device for the setting of the optical reference frequency generator or reference laser (240) so that the beat signal is minimal or has a predetermined beat frequency.

24. Laser device according to claim 15, claim 16 or claim 18 whereby a mode control loop (I, 210, 214) is provided for the relegation of the dispersion setting device (7, 8, 8') or the regulation of the resonator length setting device (5), dependent upon the frequency deviation of the frequency of a first reference laser (240a), which is phase coupled with a first lower frequency reference mode ($M_1$) of the light pulses, from the frequency of a second reference laser (240b), which is phase coupled wit a second ($M_2$) higher frequency reference mode of the light pulses.

25. Laser device according to claim 15 or 16 whereby a repetition frequency control loop (II, 220, 224) is provided for the regulation of the resonator length setting device (5) or the dispersion setting device (7, 8, 8'), dependent upon the frequency deviation of at least one differential frequency between the repetition frequency of the light pulses and a radio frequency.

26. Laser device according to claim 25, whereby a radio frequency reference generator (25) is provided for the generation of the reference radio frequency and the repetition frequency control loop comprise a device for the generation of a beat signal from the signal of a photosensitive element (221) that captures the light pulses, and from the signal of a radio frequency reference generator (250), and a frequency reference control (224) for the resonator length setting device (5) or the dispersion setting device (7, 8, 8'), whereby the repetition frequency control (224) is structured so that the resonator length setting device or the dispersion setting device (7, 8, 8') is operated so that the second oscillating signal is minimal or possesses a predetermined frequency.

27. Laser device according to claim 15 or 16, whereby the active medium (4) includes a solid or a dye medium.

28. Laser device according to claim 15 or 16, whereby a device (201) is provided for self phase modulation.

* * * * *